United States Patent [19]

Sata et al.

[11] Patent Number: 4,715,691

[45] Date of Patent: Dec. 29, 1987

[54] ELECTROCHROMIC DISPLAY USING BIPOLAR ION-EXCHANGE MEMBRANE

[75] Inventors: Toshikatsu Sata, Tokuyama; Teruaki Katsube, Tokyo; Yoshiya Iida, Yokohama, all of Japan

[73] Assignee: Tokuyama Soda Kabushiki Kaisha, Yamaguchi, Japan

[21] Appl. No.: 807,250

[22] Filed: Dec. 10, 1985

[30] Foreign Application Priority Data

Dec. 12, 1984 [JP] Japan .................. 59-260858

[51] Int. Cl.⁴ .................................. G02F 1/23
[52] U.S. Cl. .................................. 350/357
[58] Field of Search .......................... 350/357

[56] References Cited

U.S. PATENT DOCUMENTS

| | | | |
|---|---|---|---|
| 4,033,673 | 7/1977 | Seki | 350/357 |
| 4,116,545 | 9/1978 | Reddy | 350/357 |
| 4,193,670 | 3/1980 | Giglia et al. | 350/357 |
| 4,335,938 | 6/1982 | Giglia et al. | 350/357 |
| 4,361,385 | 11/1982 | Huang et al. | 350/357 |
| 4,375,318 | 3/1983 | Giglia et al. | 350/357 |
| 4,416,517 | 11/1983 | Beall et al. | 350/357 |
| 4,456,337 | 6/1984 | Nicholson | 350/357 |
| 4,478,991 | 10/1984 | Huang et al. | 350/357 |

FOREIGN PATENT DOCUMENTS

| | | | |
|---|---|---|---|
| 144529 | 9/1982 | Japan | 350/357 |
| 2005856A | 4/1979 | United Kingdom | |
| 2088112 | 5/1982 | United Kingdom | 350/357 |
| 2112557 | 7/1983 | United Kingdom | 350/357 |

OTHER PUBLICATIONS

Cuomo et al, "Conductively Coated Porous Medium for Use in Electrochromic Membrane", IBM Tech. Disc. Bull, 4–1976, p. 3865.

Wilson et al., (1960) The Electrodioalysis Process. In: Demineralization by Electrodialysis (Wilson Ed).

Primary Examiner—William H. Punter
Attorney, Agent, or Firm—Sherman and Shalloway

[57] ABSTRACT

An electrochromic display composed of a transparent electroconductive membrane, an electrochromic membrane, an ion-exchange membrane and a counter electrode in a laminated structure. The ion-exchange membrane is a bipolar ion-exchange membrane composed of at least one cation-exchange membrane layer having cation-exchange groups and at least one anion-exchange membrane layer containing anion-exchange groups in a laminated structure. The electrochromic display has a superior response speed, contrast and resolving power as well as a long service life.

8 Claims, 1 Drawing Figure (I) BIPOLAR ION EXCHANGE MEMBRANCE
(II) POLYSTYRENESULFONIC ACID
(III) POLY-LAURYLDIMETHYL BENZYLAMMONIUMCHLORIDE (I) BIPOLAR ION EXCHANGE MEMBRANCE (II) POLYSTYRENESULFONIC ACID (III) POLY-LAURYLDIMETHYLBENZYLAMMONIUMCHLORIDE

ELECTROCHROMIC DISPLAY USING BIPOLAR ION-EXCHANGE MEMBRANE

BACKGROUND OF THE INVENTION

1. Field of the Invention

This invention relates to an electrochromic display having a high response speed, an excellent contrast, a high resolving power and a long service life. More specifically, it relates to an improved electrochromic display containing a bipolar ion-exchange membrane as an electrolyte layer.

2. Description of the Prior Art

The electrochromic display, to be sometimes abbreviated "ECD" hereinafter, is a display which makes use of a reversible change in color that takes place in an inorganic or organic substance upon the application of voltage. It is easier to view than liquid crystal displays because it has no dependence upon visual field angles. It is also characterized, for example, by having a memory function and being able to be driven at low voltages. From the practical standpoint, however, its service life, response speed and contrast have not proved to be entirely satisfactory, and it has been desired to develop ECD which is satisfactory in these three factors.

It is known that ECD is generally composed of a transparent electroconductive membrane, an electrochromic membrane, an electrolyte layer and a counter electrode in a laminated structure. The life, response speed and contrast of ECD depend greatly not only upon the kind of a substance constituting the electrochromic membrane, but also upon the kind of a substance constituting the electrolyte layer.

Various electrolytes have been proposed heretofore for use in the electrolyte layer. Typical examples include liquid electrolytes such as an aqueous solution of sulfuric acid and a propylene carbonate solution of lithium perchlorate ($LiClO_4$), solid electrolytes such as antimonic acid, tantalum oxide and magnesium fluoride, and ion-exchange membranes.

ECD comprising an electrolyte layer containing a liquid electrolyte generally has good response speeds and contrasts, but is inferior in service life because of the dissolution of the electrochromic membrane in the liquid electrolyte and the problem of the counter electrode. ECD comprising a solid electrolyte layer has a long service life, but is inferior in response speed and contrast. When an ion-exchange membrane is used as the electrolyte layer, ECD having a high response speed and a long life may be obtained depending upon the type of the ion-exchange membrane.

The formidable problem associated with displaying by these electrochromic displays is that since the correspondence of the degree of coloration to an applied voltage is linear (namely, the voltage and the current are in a linear relationship), these electrochromic displays have a low resolving power in displaying fine details and cannot give clear displayed images. For example, in displaying fine details such as characters and figures in ECD, there is employed a method in which the display is divided into a plurality of segments, and voltage is applied to a combination of the required segments. With this method, however, color blurring tends to occur in coloring and discoloring characters, figures, etc. and leads to the inability to provide clear display images. In the case of using the ion-exchange membrane in the electrolyte layer, coloration and discoloration cannot be maintained clear during long-term use, or the contrast may become insufficient.

SUMMARY OF THE INVENTION

It is an object of this invention therefore to provide an electrochromic display having a high response speed, an excellent contrast and particularly a high resolving power.

Another object of this invention is to provide an electrochromic display whose response speed and contrast are not reduced upon long-term use.

Still another object of this invention is to provide an electrochromic display which can display images of characters, figures, etc. with a high resolving power and without color blurring.

Other objects of this invention along with its advantages will become apparent from the following description.

According to this invention, there is provided an electrochromic display composed of a transparent electroconductive membrane, an electrochromic membrane, an ion-exchange membrane and a counter electrode in a laminated structure, said ion-exchange membrane being a bipolar ion-exchange membrane comprising at least one cation-exchange membrane layer having cation-exchange groups and at least one anion-exchange membrane layer having anion-exchange groups in a laminated structure.

BRIEF DESCRIPTION OF THE ACCOMPANYING DRAWING

The accompanying drawing, FIG. 1, shows the relation between the applied voltage (V) and the injected charge ($mc/cm^2$) measured with regard to the electrochromic displays described in Example 1 (two of which are comparisons).

DETAILED DESCRIPTION OF PREFERRED EMBODIMENTS

Figure 1:
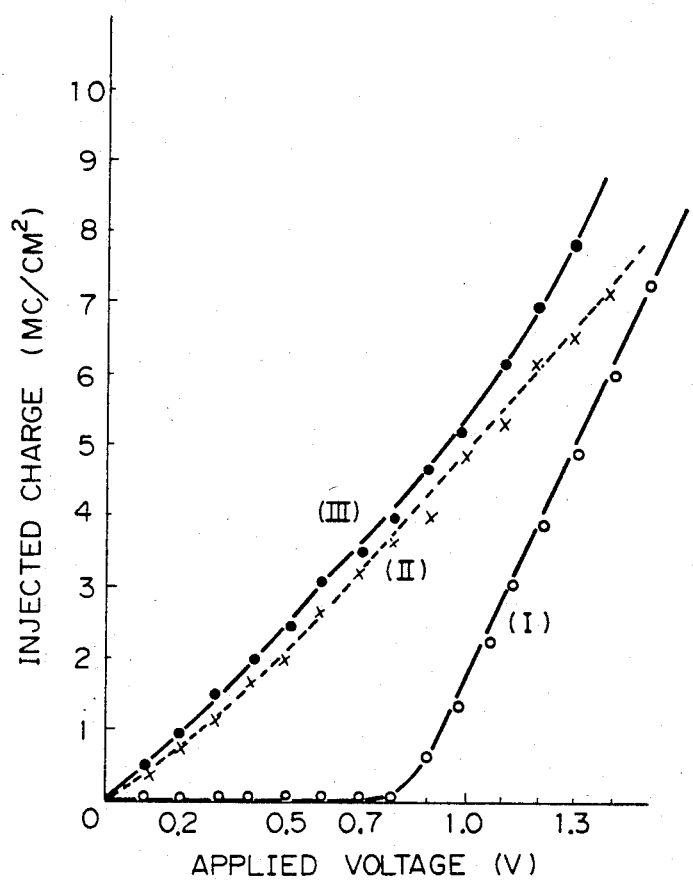

The cation-exchange groups and the anion-exchange groups contained in the cation-exchange membrane layer and the anion-exchange membrane layer used in the ECD of this invention may be those groups which act as cation-exchange groups and anion-exchange groups under use conditions of the ECD. Thus, at the time of building ECD, these membrane layers may be a polymeric layer having functional groups which can be converted to cation-exchange groups or anion-exchange groups under the use conditions.

The transparent electroconductive membrane, the electrochromic membrane and the counter electrode used in the ECD of this invention may be any of those which are known in the art. For example, thin membranes of oxide semiconductors such as indium oxide-tin oxide (ITO), tin oxide, zinc oxide, titanium oxide, cadmium oxide and tin-cadmium oxide, and thin membranes of gold, silver, etc. having a thickness of not more than 50 Å may suitably be used as the transparent electroconductive membrane. The electrochromic membrane used is most typically a membrane of amorphous tungsten oxide. It may also include, for example, membranes of organic dyes, metal complexes, transition metal compounds, and polymers of organic compounds which have recently been studied as electrochromic materials. Specific examples are such organic compounds as prussian blue, phthalocyanines, spiropyrans, viologens and phthalic acid derivatives, and polymeric compounds containing units of such organic compounds. The counter electrode may be made of such a known material as iridium oxide, an indium oxide-tin oxide membrane (ITO membrane), metals, amorphous tungsten oxide, iron complexes, sintered bodies of transition metal oxides and carbon, and manganese oxide.

Generally, the ECD of this invention is built by laminating the transparent electroconductive membrane, the electrochromic membrane, the ion-exchange membrane and the counter electrode in this order. But it may be of any laminated structure so long as the resulting structure functions as an electrochromic display. For example, the ECD of the invention may be constructed by laminating the transparent electroconductive membrane, the electrochromic membrane, the ion-exchange membrane, the electrochromic membrane and the counter electrode, or the transparent electroconductive membrane, the elctrochromic membrane, the ion-exchange membrane, the counter electrode and the electrochromic layer, or the transparent electroconductive membrane, the electrochromic membrane, the ion-exchange membrane, the counter electrode and the transparent electroconductive membrane, in the order stated. The ECD composed of the five layers frequently has a good contrast between coloration and discoloration, a high response speed, and a long service life, and constitutes a preferred embodiment of the invention.

The ECD of this invention may be of the transmission type or the reflection type. In the case of the reflection-type ECD, it is preferred to provide a reflection plate of a white or other suitable color at the back of electrochromic membrane which undergoes coloration and discoloration.

The greatest characteristic feature of the ECD of this invention is that the ion-exchange membrane is a bipolar ion-exchange membrane. The bipolar ion-exchange membrane itself is known and used widely in the field of electrodialysis using an ion-exchange membrane. In the present invention, any known bipolar ion-exchange membranes can be used. Typical examples of the basic structure are shown below.

(1) A laminate of one cation-exchange membrane layer having cation-exchange groups and one anion-exchange membrane layer having anion-exchange groups.

(2) A laminate composed of two anion-exchange membrane layers having anion-exchange groups and a cation-exchange membrane layer having cation-exchange groups sandwiched between the anion-exchange membrane layers.

(3) A laminate composed of two cation-exchange membrane layers having cation-exchange groups and an anion-exchange membrane layer having anion-exchange groups sandwiched between the cation-exchange membrane layers.

(4) A laminate composed of a cation-exchange membrane layer having cation-exchange groups, an anion-exchange membrane layer having anion-exchange groups, and an ionically electroconductive hydrous neutral membrane layer (a layer not containing ion-exchange groups) interposed between the ion-exchange layers.

Generally, the bipolar ion-exchange membrane is preferably composed of organic polymeric compounds to be described hereinafter. In the present invention, however, it is not necessarily composed of an organic polymeric compound, and may comprise a component composed of a membrane of an inorganic ion exchanger. For example, such a component may be prepared by dispersing an inorganic ion exchanger such as zirconium phosphate, silicotungstic acid or antimonic acid in a solution of a suitable binder such as polyvinyl alcohol, polyvinyl chloride, polyvinyl butyral or polystyrene in a suitable solvent, casting the dispersion, and evaporating the solvent. Other suitable inorganic ion exchanger membranes include a film obtained by uniformly milling the above inorganic ion exchanger with a thermoplastic polymer in suitable proportions and heatmolding the mixture and a membrane obtained by molding the inorganic ion exchanger using an organic polymeric electrolyte such as polyacrylic acid or a binder. The resulting membrane may be used as one component of the bipolar ion-exchange membrane.

In the present invention, the bipolar ion-exchange membrane to be described is composed of organic polymeric compounds unless otherwise indicated. It should be understood however that the bipolar ion-exchange membrane used in this invention is not limited to those composed of organic polymeric compounds.

The bipolar ion-exchange membrane used in this invention generally represents a nonlinear curve when its voltage-current curve is measured. A particularly preferred bipolar ion-exchange membrane is one which has such a nonlinear voltage-current curve that at voltages up to a certain value, a small amount of current flows and at a voltage above the certain value, a large amount of current flows (namely, a knick exists in the curve and the amount of current abruptly changes). Various methods are available to impart such a characteristic to the bipolar ion-exchange membrane. Generally, it is preferred to adjust the transport number of the cation-exchange membrane layer or the anion-exchange membrane layer constituting the bipolar ion-exchange membrane to 0.70–1.0. Furthermore, for the exhibition of the characteristics of the bipolar ion-exchange membrane, it is preferred to purify the starting materials for the production of the bipolar ion-exchange membrane, or the resulting bipolar ion-exchange membrane. Also preferred is a bipolar ion-exchange membrane which is composed of a cation-exchange membrane layer having no anion-exchange group and an anion-exchange membrane layer having no cation-exchange group.

As stated above, the bipolar ion-exchange membrane used in this invention does not necessarily have to contain the aforesaid cation-exchange groups or anion-exchange groups at the time of constructing ECD, and may contain functional groups which can be converted to the cation-exchange groups or anion-exchange groups under use conditions of ECD. There is no particular restriction on the functional groups convertible to cation-exchange groups or anion-exchange groups under the use conditions, and any known functional groups may be used. Typical examples are $-SO_2X$, $-COX$, $-CN$, $-COR$ and $-SO_2R$ (wherein X is a halogen atom and R is an alkyl group) which are functional groups convertible to cation-exchange groups, and an epoxy group and benzyl halide groups which are functional groups convertible to anion-exchange groups.

The amount of the ion-exchange groups bonded to the bipolar ion-exchange membrane is not particularly limited so long as the resulting ECD operates. Generally, it is advantageously selected from 0.2–12 milliequivalents/g of dry polymer, preferably 0.5–8 milliequivalents/g of dry polymer.

In the bipolar ion-exchange membrane, water is dissociated in the interface between the cation-exchange membrane layer and the anion-exchange membrane layer, and an electric current flows. At voltages up to the points at which the dissociation of water occurs, hardly any current flows. $H^+$ and $OH^-$ generated by the dissociation of water at a certain voltage impart ionic electroconductivity, and at voltages above this voltage, an electric current abruptly flows. To increase the amounts of $H^+$ and $OH^-$ generated by the dissociation of water, it is further preferred that catalysts which promote the dissociation of water, for examples, noble metals, their oxide and their derivatives such as ruthenium, rhodium, palladium, iridium, platinum, ruthenium oxides, platinum black, platinic acid and so on be placed in the bipolar ion-exchange membrane, particularly in the inferface between the cation-exchange membrane layer and the anion-exchange layer. In a bipolar ion-exchange membrane in which the aforesaid ionically electroconductive neutral membrane is interposed between the cation-exchange membrane layer and the anion-exchange membrane layer, good results are obtained by providing the catalysts on the neutral membrane.

The polymers constituting the ion-exchange membrane layers constituting the bipolar ion-exchange membrane used in this invention may preferably have a hydrocarbon main chain to which the ion-exchange groups are bonded either directly or through an aromatic ring or an aliphatic side chain. Also preferred are polymers in which ion-exchangeable groups are bonded to the polymer main chain, as in laminated cationic polymeric electrolytes. Perfluorocarbon polymers having ion-exchange groups bonded thereto are more effective as a component of the ion-exchange membrane layers used in this invention. Those known polymers which are used in ion-exchange membranes may be used without any particular restriction to form the ion-exchange membrane layers of the bipolar ion-exchange membrane used in this invention. Examples of such polymers include a styrenesulfonic acid polymer or salts thereof and copolymers of styrenesulfonic acid with polyvinyl compounds, polyallyl compounds or polymethallyl compounds capable of forming a crosslinked structure, such as divinylbenzene, (crosslinked polymers); polymers of acrylic acid or methacrylic acid, salts of these polymers, crosslinked polymers of these monomers and copolymers of these monomers with other copolymerizable monomers; salts of vinylpyridine polymers, salts and N-alkylation products of these polymers, and crosslinked polymers or copolymers thereof; salts and N-alkylated products of imidazole polymers and crosslinked polymers or copolymers thereof; copolymers of perfluoroalkyl vinyl ether sulfonyl fluorides and tetrafluoroethylene which have been subjected to a hydrolysis treatment to provide sulfonic acid groups, and salts of such polymers; and copolymers of perfluoroalkyl vinyl ether carboxylic acid alkyl esters and tetrafluoroethylene which have been subjected to a hydrolysis treatment to provide carboxylic acid groups, or salts thereof.

Examples of the cation-exchange groups which are effectively used in this invention include a sulfonic acid group, sulfinic acid, a carboxylic acid group, a phosphoric acid group, a phosphorous acid group, sulfate ester groups, phosphate ester groups, a phenolic hydroxyl group, a thiol group, and metal complex groups having a negative charge in aqueous solution and polar organic solvents. Preferred cations as a counter ion include, for example, a hydrogen ion, an ammonium ion, metal ions and organic ammonium ions.

The anion-exchange groups include, for example, primary, secondary, and tertiary amino groups, quaternary ammonium salt groups, tertiary sulfonium salt groups, quaternary phosphonium salt groups, cobalticinium salt groups, and other groups having a positive charge in aqueous solution and polar organic solvents. Examples of counter ions include inorganic ions such as a sulfate ion, a nitrate ion, a hydroxyl ion, a nitrite ion, a sulfite ion, a phosphate ion, a phosphite ion, a chlorate ion perchlorate ion, $BF_4^-$ and a hypochlorite ion, and low-molecular-weight organic anions having a negative charge such as a carboxylic acid group and a sulfonic acid group.

Among these, such groups of the acid type as a carboxylic acid groups and a sulfonic acid groups, and such groups of the salt type as metal salt groups and organic ammonium salt groups are preferred as the cation-exchange groups, and groups derived from halogen salts and organic acid salts of quaternary ammonium bases and acid salts and organic acid salts of primary, secondary and tertiary amines.

The electroconductive neutral membrane that may be used in this invention is not limited in particular, and any membranes prepared from polymers having no ion-exchange groups bonded thereto may be used. Typical neutral membranes which can generally be preferably used are ion-permeable neutral membranes prepared from polyvinyl alcohol, polyacrylamide, polyvinyl pyrrolidone, and cellulosic polymers typified by cellophane. The thickness of the neutral membrane, which may vary depending upon the types of the ion-exchange membrane layers, is generally not more than 50 microns, preferably not more than 25 microns.

The thickness of the bipolar ion-exchange membrane used in this invention does not essentially change depending upon the number of constituent layers, and is generally 0.1 to 500 microns, preferably 1 to 250 microns.

The bipolar ion-exchange membrane used in this invention may comprise two or three layers as shown in (1) to (4) above, or may comprise four or more layers resulting from the combination of (1) to (4) appropriately. But not all the individual layers of the bipolar ion-exchange membrane have to be solid. Rather, it is frequently effective to provide a liquid layer if the adhesions of the individual layer to each other or to the electrochromic membrane, the counter electrode, etc. are considered. However, a bipolar ion-exchange membrane composed solely of liquid ion-exchanger layers cannot be produced, and at least one constituent layer of the bipolar ion-exchange membrane should be composed of a solid polymer membrane containing ionic groups. Examples of preferred forms of the layers constituting the bipolar ion-exchange membrane of the ECD of this invention are shown below.

(a) All the layers constituting the bipolar ion-exchange membrane are solid ion-exchange membrane layers.

(b) The bipolar ion-exchanger membrane is composed of at least one liquid ion-exchanger layer and at least one solid ion-exchanger membrane layer.

(c) The bipolar ion-exchange membrane is composed of solid cation-exchange membrane layers (or anion-exchange membrane layers) and sandwiched between them a liquid anion-exchanger layer (or a cation-exchange membrane layer).

(d) The bipolar ion-exchange membrane is composed of liquid cation-exchanger layers (or anion exchange membrane layers) and sandwiched between them an anion exchanger layer (or a cation-exchanger layer) in the form of a solid membrane.

(e) The bipolar ion-exchange membrane is composed of liquid anion-exchanger and cation-exchanger layers and a neutral ionically electroconductive membrane partitioning the two liquid layers.

Bipolar ion-exchange membranes composed of four or more layers may be constructed by combining the above embodiments (a) to (e). In this case, it is necessary to place a solid ion-exchange membrane layer between liquid ion-exchanger layers to separate the liquid ion-exchanger layers.

There is no particular limitation on the formation of the membrane layers constituting the bipolar ion-exchange membrane used in the invention, and any known methods can be used. For example, according to a generally preferred method, a membrane as a base is first synthesized from a monomer. The production of the membrane is not particularly limited, and known techniques for producing known ion-exchange membranes can be directly utilized. Then, a monomer in paste or liquid form for formation of another membrane layer is cast on the surface of the base membrane and polymerized to form the required thin layers successively. As required, ion-exchange groups may be introduced by an after-treatment. When the bipolar ion-excange membrane used in this invention contains a neutral membrane as a constituent, the neutral membrane layer should be sandwiched between ion-exchange membrane layers.

When the bipolar ion-exchange membrane contains a liquid ion-exchanger layer, it can be produced by first producing an ion-exchange membrane by the aforesaid known method, and casting a liquid ion-exchanger onto this membrane. Alternatively, a liquid ion exchanger is cast on the surface of the electrochromic membrane or the counter electrode, and a solid ion-exchange membrane is laminated to it.

The ECD of this invention is constructed by laminating the individual constituent membrane layers so that they are bonded to each other physically or chemically. The method of lamination is not particularly restricted, and known methods can be used. In a most preferred embodiment of the ECD of this invention, the bipolar ion-exchange membrane is chemically integrated with the electrochromic membrane and/or the counter electrode. By way of illustration, methods will be described below which simultaneously form the bipolar ion-exchange membrane on the surface of the electrochromic layer and integrate the bipolar ion-exchange membrane with the electrochromic membrane. It should be understood however that the construction of the ECD of the invention is in no way limited to these specific methods.

1. A method in which a membrane layer containing cation-exchange groups or anion-exchange groups is formed on the electrochromic membrane and the counter electrode, and the two are laminated to form an integrated structure. Alternatively, a neutral membrane is interposed between the two at the time of integrating them by the above method. In still another variation, a solution of a neutral polymer is cast on one or both of the ion-exchange membrane layers to form a film, and thereafter the two are laminated.

2. A method which comprises forming a membrane layer containing cation-exchange groups or anion-exchange groups on the electrochromic membrane or the counter electrode, thereafter forming a neutral membrane layer on the resulting membrane layer, further forming a membrane layer containing anion-exchange groups or cation-exchange groups on the nuetral membrane layer, and laminating the electrochromic membrane or the counter electrode to the ion-exchange membrane layer.

3. A method which comprises introducing cation exchange groups and anion exchange groups from both sides of a polymeric film having functional groups (which permits easy introduction of both the cation and anion exchange groups) to make a bipolar ion exchange membrane, and laminating the electrochromic membrane to one side of the polymeric film and the counter electrode to the other side.

4. A method which comprises laminating a polymeric membrane (cation-exchange membrane) having cation-exchange groups and a polymeric membrane (anion-exchange membrane) having anion-exchange groups into one polymeric film, and laminating the electrochromic membrane and the counter electrode respectively to both sides of the polymeric membrane. Alternatively, a neutral membrane may be inserted between the cation-exchange membrane and the anion-exchange membrane at the time of laminating the two.

5. A method in which a liquid or solvent-soluble polymer having cation-exchange groups and a liquid or solvent-soluble polymer having anion-exchange groups are cast into spaces defined by the electrochromic membrane, the neutral membrane and the counter electrode which are aligned in spaced-apart relationship in parallel to each other at certain intervals.

The above layers having cation-exchange groups or anion-exchange groups may be prepared from liquid polymers, or solvent-soluble linear polymers or branched polymers, and if required, may have a three-dimensional crosslinked structure.

There is no particular limitation on the materials from which the bipolar ion-exchange membrane is produced. Specific examples of suitable materials containing cation-exchange groups include polymers obtained by polymerizing at least one vinyl monomer as an acid or salt, e.g., styrenesulfonic acid, acrylic acid, methacrylic acid, vinylsulfonic acid and 2-acrylamide-2-methylpropanesulfonic acid, or copolymers of these vinyl monomers with monomers having no ion-exchange group such as styrene and acrylonitrile, and polymers obtained by polymerizing at least one of esters of the aforesaid vinyl monomers, followed by hydrolysis. The above polymers may be linear or partially branched polymers, and the copolymers may be grafted copolymers. Specific examples of suitable materials containing anion-exchange groups include polymers obtained by polymerizing at least one monomer such as vinylpyridines, vinyl imidazoles, vinyl benzyl alkylamines and vinylbenzyl alkyl ammonium bases, and copolymers of these monomers with at least one monomers containing no ion-exchange group, such as styrene and acrylonitrile. These polymers may include linear polymers and partially branched polymers, or may be those prepared by using polyethyleneimine.

When the polymers containing ion-exchange groups are to be used in the liquid state, they may, as required, be dissolved in suitable solvents such as water, alcohols, ethylene glycols, glycerin and aprotic solvents such as dimethyl sulfoxide and dimethylformamide. Generally, the concentrations of the polymers in the solutions is 2 to 90%, preferably 10 to 60%.

The mode of use of the ECD of this invention is not particularly limited. Generally, the following modes of use are preferred. For example, it is preferred that the electrochromic membrane as a constituent of ECD is used in a form divided into n and m segments (n and m are positive integers) along the X-axis (vertical direction) and the Y-axis (lateral direction). The number of such segments differs depending upon the size of the ECD and cannot be generalized. Usually, however, n and m are each several to several millions. Any known means may be used in dividing the electrochromic membrane into segments. Typical preferred methods are shown below. For example, a lattice-like barrier is formed on the transparent electroconductive membrane, such as an ITO membrane, when forming the electrochromic membrane on it. After the formation of the electrochromic membrane, the barrier is removed whereby the electrochromic membrane is segmented. When a large number of segments are desired, it is especially effective to utilize the photoresist methods which are widely utilized in the IC and LSI industry. For example, the electrochromic membrane is formed on a substrate (such as ITO) constituting the transparent electroconductive membrane, and thereafter, a negative or positive photoresist prepared from photosensitive resin is coated on the electrochromic membrane. The coated electrochromic membrane is then exposed through a mask forming partitions for segmentation. The photoresist in the areas of the partitions is dissolved, and the product is treated with an acid or an alkali capable of dissolving the electrochromic membrane or ITO at the areas of partitions. Finally, the remaining photoresist is removed to provide segments on the electrochromic membrane.

The ECD of this invention so obtained can permit a control of coloration and discoloration with low power consumption and has a long service life, a high response speed and an excellent contrast as compared with ECD constructed by merely pressing an ion-exchange membrane prepared in advance against an electrochromic membrane and ECD obtained by integrating only ion-exchange membrane layers. For example, the ECD of the invention can control coloration and discoloration with 80 to 90% power consumption as compared with the latter, and has 3 to 5 times or more as long a service life, 1.2 to 1.5 times or more as high as response speed, and about 1.2 times as good a contrast, as the latter.

The following Examples and Comparative Examples illustrate the present invention more specifically. It should be understood that the invention is in no way limited to these examples.

In these examples, membranes of inorganic compounds, $IrO_2$ and $WO_3$, were used as the electrochromic membrane. In the following the $IrO_2$ membrane is sometimes abbreviated as the I membrane, and the $WO_3$ membrane, as the W membrane. The response speeds, contrasts, power consumptions, lives and resolving powers in matrix driving of ECDs were evaluated both in the case of using $IrO_2$ membrane as the electrochromic membrane and in the case of using the $WO_3$ membrane as the electrochromic membrane.

The I membrane and the W membrane were prepared by the following methods.

The I membrane was formed on a transparent electroconductive membrane by high-frequency sputtering in an atmosphere of pure oxygen. Specifically, an iridium (99.999% pure) plate was used as a target, and a glass plate having a size of 15 mm×10 mm coated with a transparent tin oxide membrane (20 ohms/□) was used as a substrate. The substrate was well washed with an organic solvent and pure water, dried and mounted in a vacuum vessel. The inside of the vacuum vessel was evacuated to a vacuum of less than $4 \times 10^{-7}$ torr. The substrate was then heated in a high vacuum at about 100° C. for several minutes then cooled with water, and maintained at less than 40° C. Sputtering was performed by using pure oxygen. The pressure of the oxygen was maintained at 10 mm, and the high-frequency power was maintained at 0.5 W/cm². The film deposition speed at this time was 10 Å/min., and the thickness of the resulting I membrane was 700 Å.

The W membrane was formed on the same substrate as used in the formation of the I membrane, by an electron beam vacuum deposition method. A $WO_3$ (99.99% pure) target was used, and a film having a thickness of 3000 Å was formed at a speed of 4–5 Å/sec.

When the resolving power of ECD is to be evaluated by forming segments, ECD is constructed as follows: First, segments are formed by the photoresist method on a W membrane formed by the above method on a transparent electroconductive membrane of a large area. An ion-exchange membrane is laminated to the W membrane, and then a composite film (counter electrode) composed of a transparent electroconductive membrane and iridium oxide prepared by the above sputtering method to prepare ECD.

The response speed, contrast, life and power consumption were measured by using ECD so constructed. The response speed is the time which elapses until after the application of voltage, the contrast reaches 90% of the saturation value. The contrast is the ratio of the maximum transmittance to the minimum transmittance in the cycle of coloration and discoloration. The life is the number of coloration and discoloration cycles which are repeated until the contrast decreases ½ the initial value. The power consumption is power consumed when a 1 cm² segment of the ECD is colored and discolored at a frequency of 1/sec.

EXAMPLE 1

Thirty parts of commercial chloromethylstyrene was dissolved in 100 parts of benzene, and 3 parts of α,α'-azobisisobutylonitrile was dissolved in the solution. The solution was heated at 70° C. for 8 hours and poured into a large excess of methanol to give a rubbery polymer. The polymer was dissolved in acetone. The solution was poured into methanol to precipitate and purify the polymer. After drying under reduced pressure, the resulting polymer was determined to be a chloromethylstyrene polymer by elemental analysis and infrared spectroscopy. The molecular weight of the resulting polymer, measured by gel permeation chromatography using polystyrene as a standard, was 7600.

The polychloromethylstyrene (42 parts), 130 parts of methyl ethyl ketone and 11 parts of lauryl dimethylamine were put into a flask equipped with a cooling tube, and heated at 70° C. for 20 hours. A wax-like substance settled at the bottom of the flask. The upper liquid layer was removed, and the white polymer at the bottom was taken out, dried in the air and further dried under reduced pressure. The polymer was extracted with diethyl ether for 16 hours in a Soxhlet extractor, and dried in the air and again under reduced pressure.

A solution composed of 50 parts of the resulting polymer, 40 parts of water and 10 parts of diethylene glycol was prepared. A molding frame with a thickness of 25 microns was placed on each of electrochromic membranes of $WO_3$ and $IrO_2$, and the resulting solution was poured into the frame, dried in air and then under reduced pressure.

Separately, 5 parts of commercial sodium styrenesulfonate was dissolved in 150 parts of water, and 0.1 part of sodium sulfite and 0.2 part of sodium persulfate were added. The mixture was heated at 80° C. for 10 hours. The resulting slightly viscous liquid was dried by a rotary evaporator to give a slightly yellow solid. It was found to have an inherent viscosity, measured in water at 20.5° C., of 0.11 dl/g.

Fifty parts of the resulting polymer was dissolved in 50 parts of water, and 10 parts of propylene glycol was added to form a viscous solution. A molding frame having a thickness of 10 microns was placed on each of the electrochromic membrane on which an ion-exchange membrane layer having quaternary ammonium salt groups was formed. The viscous solution was poured into the frame, and dried in air and then under reduced pressure. The resulting integrated structure of the electrochromic membrane and the ion-exchange membrane layer was equilibrated in an atmosphere having a relative humidity of 50%, and then a counter electrode composed of a sintered body of an iron complex and carbon was laminated to the integral structure to form an ECD. The properties of the ECD are shown in Table 2.

Using the resulting ECD, the amount of an injected charge was measured at varying voltages applied. The results are plotted in FIG. 1. It is seen from FIG. 1 that as the applied voltage increase, charge injection is not effected at low voltages, but at voltages above a certain value, charge injection is abruptly carried out. For comparison, the relation of the amount of an injected charge to the applied voltage was likewise determined with regard to an ECD in which the electrolyte layer was composed only of polystyrenesulfonic acid, and an ECD in which the electrolyte layer was composed of the reaction product of polychloromethylstyrene and lauryl dimethylamine. The results are shown in Table 1. The results of Table 1 are plotted in FIG. 1. The results given in Table 1 and FIG. 1 clearly show the differences in operation among the ECDs obtained as above.

TABLE 1

| Amount of injected charge (millicoulombs/cm$^2$) | | |
| --- | --- | --- |
| Ionically electroconductive material | | |
| I | II | III |
| Driving voltage (V) | | |
| 0.1 | 0 | 0.4 | 0.5 |
| 0.2 | 0 | 0.8 | 1.0 |
| 0.3 | 0 | 1.2 | 1.5 |
| 0.4 | 0 | 1.8 | 2.0 |
| 0.5 | 0 | 2.0 | 2.6 |
| 0.6 | 0 | 2.6 | 3.3 |
| 0.7 | 0 | 3.2 | 3.6 |
| 0.8 | 0 | 3.6 | 4.0 |
| 0.9 | 0.5 | 4.0 | 4.8 |
| 1.0 | 1.5 | 4.9 | 5.3 |
| 1.1 | 2.5 | 5.4 | 6.1 |
| 1.2 | 4.0 | 6.1 | 6.8 |
| 1.3 | 5.1 | 6.7 | 7.8 |
| 1.5 | 7.5 | 8.0 | — |

EXAMPLE 2

A film of a perfluoro(3,6-dioxa-4-methyl-7-octylsulfonyl fluoride)/tetrafluoroethylene copolymer having an exchange capacity of 0.91 milliequivalents/g of dry film (H type) was immersed for 2 hours at 90° C. in a hydrolysis bath composed of 30 parts of dimethyl sulfoxide, 55 parts of water and 15 parts of sodium hydroxide to introduce sodium sulfonate groups. The film was then immersed in 1N hydrochloric acid to convert the sodium sulfonate groups to sulfonic acid groups. Hydrochloric acid was exchanged three times during the immersion. The sulfonic acid-type film so obtained was introduced into an autoclave together with a mixture of isopropyl alcohol and water in a ratio of 4:1, and heated at 250° C. for 5 hours. Most of the film dissolved. Ethylene glycol was dissolved to a concentration of 0.1% in a 0.5% water/isopropyl alcohol solution of the resulting polymer having perfluorosulfonic acid groups, and the solution was sprayed onto each of electrochromic membranes of $WO_3$ and $IrO_2$ and then dried by a hair dryer. This operation was repeated. The thickness of the resulting polymer membrane, measured in an atmosphere having a relative humidity of 50%, was 0.05 mm.

A molding frame having a thickness of 0.02 mm was placed on the coated electrochromic membrane. A mixture of 1 part of polyethylene glycol having a molecular weight of 20,000 and 50 parts of a fine powder of a polymer having quaternary ammonium salt groups obtained by treating polychloromethylstyrene synthesized in the same way as in Example 1 with dimethyl laurylamine was dispersed into the space defined by the molding frame, and heated to 90° C. Consequently, it was melted and a uniform ion-exchange membrane layer formed within the frame. The resulting structure was left to stand in an atmosphere having a relative humidity of 70%, and the same counter electrode as used in Example 1 was laminated to this structure to build an ECD. The properties of the ECD are shown in Table 2.

EXAMPLE 3

Five parts of 2-methyl-5-vinylpyridine, 20 parts of sodium styrenesulfonate, 1 part of divinylbenzene and 2 parts of tetraethylene glycol were mixed, and 0.3 part of benzoyl peroxide was dissolved in the mixture. The resulting monomeric mixture was coated on each of electrochromic films of $WO_3$ and $IrO_2$. The coating was irradiated for 30 minutes with light from an ultraviolet lamp (SL-100B, a product of Toshiba Co.) placed 5 cm apart from the coated surface to polymerize the monomeric mixture. The coated electrochromic film was subjected to deaeration under reduced pressure, immersed in 1N sulfuric acid to equilibrate it, and then dried under reduced pressure. The resulting membrane had a thickness, calculated from a weight increase, of 15 microns.

A thin film containing cation exchange-membrane as main ion-exchange groups was formed on the resulting electrochromic membrane, and the membrane was put in a plasma generating device. The device was deaerated under reduced pressure, and pyridine gas diluted with helium gas was fed into the device at 13.75 MHz to perform plasma polymerization on the electrochromic membrane. The membrane was then immersed in molten polypropylene glycol (molecular weight about 5,000) to impregnate it fully into the polymer resulting from plasma polymerization. There was a weight increase of about 50%. Sulfuric acid (1N) was sprayed onto the membrane, and dried at room temperature in an atmosphere having a relative humidity of 70%. Then, a counter electrode was laminated to it to construct an ECD. The properties of the ECD are shown in Table 2.

EXAMPLE 4

Styrene (25 parts) and 0.5 part of benzoyl peroxide were put in a sealed tube, and after pressure reduction and nitrogen purging, heated at 55° to 60° C. for 3 days, whereupon they were polymerized. The sealed tube was broken, and polystyrene as a mass was taken out. It was dissolved in 300 parts of benzene, and the solution was added to a large excess of methanol to precipitate the polystyrene. The precipitated polystyrene was collected by filtration and dried under reduced pressure. Five parts of polystyrene prepared was dissolved in 100 parts of carbon disulfide, and 2 parts of anhydrous aluminum chloride and 10 parts of phosphorus trichloride were added. The mixture was left to stand at 30° C. for 16 hours with stirring. After the reaction, the reaction mixture was poured into a large excess of methanol. The resulting precipitate was fully washed with pure water. The resulting polymer was dispersed in 1N sodium hydroxide, and the mixture was stirred at 50° C. to dissolve the polymer. The resulting uniform solution was put in a cylindrical dialysis bag of cellophane. By supplying pure water to the outside of the dialysis bag, the excess of sodium hydroxide and the by-product sodium chloride were removed by dialysis. Then, nitric acid was added to the polymer solution in the dialysis bag to a normality of 0.5, and the solution was left to stand at 50° C. for 5 hours to convert the sodium phosphite groups to phosphoric acid groups. The product was put in a rotary evaporator to remove water, and thus obtain a solid polymer. The polymer was subjected to elemental analysis. From the quantitative ratio of the phosphoric acid and carbon, it was found that phosphoric acid groups were introduced into about 8 styrene units of polystyrene out of 10 styrene units.

Commercial polyethyleneimine having a molecular weight of about 100,000 was dissolved in methanol, and subsequently lauryl bromide was added. The mixture was reacted under heat to bond lauryl groups to 40% of the amino groups of the polyethyleneimine.

The resulting derivative of polyethyleneimine was dispersed in benzene in a ratio of 2:10, and the dispersion was coated on each of electrochromic membranes of $WO_3$ and $IrO_2$ and dried. This operation was repeated to form a membrane layer having a thickness of 60 microns and containing anion-exchange groups was formed on the electrochromic membrane. A molding frame (100 microns) was placed on the ion-exchange layer, and a 50% aqueous solution of the polymer containing phosphoric acid groups obtained above was cast into the frame and dried in air and then under reduced pressure to form a membrane layer containing cation-exchange groups. A counter electrode was then laminated to build an ECD. The properties of the ECD are shown in Table 2.

EXAMPLE 5

Ten parts of a monomer having the structure

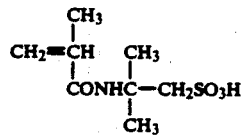

was dissolved in 200 parts of water, and 0.5 part of a polymerization initiator having the following structure

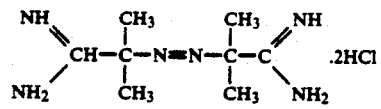

was dissolved in the solution. The solution was heated at 70° C. and left to stand for 16 hours. The resulting slightly viscous liquid was dried under reduced pressure by using a rotary evaporator to obtain a polymer. Elemental analysis and infrared absorption spectroscopy led to the determination that the resulting polymer was a polymer of the above manner.

A solution composed of 5 parts of the resulting polymer, 93 parts of water and 2 parts of glycerol was sprayed onto each of electrochromic membranes of $WO_3$ and $IrO_2$, and dried in air. The spraying was repeated five times, and the sprayed solution was dried in air in each spraying to form a membrane. The thickness of the membrane, calculated from the weight increase, was 0.13 mm.

Separately, 50 parts of 4-vinylpyridine, 5 parts of styrene, 10 parts of divinylbenzene having a purity of about 55%, and 6 parts of NBR rubber (acrylonitrile/-butadiene copolymer rubber) were uniformly mixed to obtain a viscous paste-like mixture, and 0.1 part of benzoyl peroxide was dissolved in it. A molding frame (50 microns) was placed on the surface of the cation-exchange membrane layer formed on the electrochromic membrane. The above viscous monomeric mixture was put in the molding frame. The entire assembly was then put in an autoclave, and heated at 90° C. for 3 hours in a nitrogen atmosphere at 10 kg/cm² to polymerize the monomeric mixture. The integrated structure was immersed for 8 hours in a 4:6 mixture of n-hexane and methyl iodide to N-methylate the pyridine ring, and washed with water. Then, a counter electrode was laminated onto the structure in an atmosphere having a relative humidity of 60% to build an ECD. The properties of the ECD are shown in Table 2.

EXAMPLE 6

An ion-exchange membrane layer containing quaternary ammonium salt groups was formed on each of electrochromic membranes of $WO_3$ and $IrO_2$ by the same method as in Example 1. Polyvinyl alcohol (saponification degree more than 97%; molecular weight about 50,000) was added to water and the mixture was boiled to form a 10% aqueous solution of polyvinyl alcohol. The solution was sprayed onto the ion-exchange membrane layer on the electrochromic membrane, and dried in air and then under reduced pressure. This operation was repeated to form a neutral membrane having a thickness of about 4 microns calculated from the increase in weight. The membrane-like composite so obtained was then heated at 80° C. for 30 minutes, and then the following operation was carried out.

Five parts of commercial sodium styrenesulfonic acid was dissolved in 150 parts of water, and 0.1 part of sodium sulfite and 0.2 part of sodium persulfate were added. The mixture was heated at 80° C. for 10 hours. The resulting slightly viscous solution was dried by a rotary evaporator to give a slightly yellow solid. It had an inherent viscosity, measured in water at 20.5° C., of 0.215 dl/g.

Fifty parts of the resulting polymer was dissolved in 50 parts of water, and 10 parts of propylene glycol was added to form a viscous solution. A molding frame (10 microns in thickness) was placed on the neutral membrane layer of the membrane-like product obtained above composed of the electrochromic membrane/the ion-exchange membrane layer containing quaternary ammonium salt groups/neutral membrane, and the viscous solution obtained above was poured into the molding frame, and dried in air and then under reduced pressure. The resulting integrated structure of the electrochromic membrane and the ion-exchange membrane layers was equilibrated in an atmosphere having a relative humidity of 50% at room temperature, and then a counter electrode was laminated to it to build an ECD. The properties of the ECD are shown in Table 2.

EXAMPLE 7

By the same method as in Example 2, an ion-exchange membrane layer (KIEM) having sulfonic acid groups was formed on each of electrochromic membranes of $WO_3$ and $IrO_2$ to form an electrochromic membrane/KIEM composite membrane. The composite membrane was dried under reduced pressure to remove water. An aqueous solution of polyvinyl pyrrolidone having a molecular weight of about 20,000 was coated on the surface of the KIEM layer of the composite membrane and repeatedly dried in air and then under reduced pressure. The thickness of the polyvinyl pyrrolidine film, calculated from the weight increase, was about 10 microns. A molding frame having a thickness of 0.02 mm was placed on the surface of the resulting polyvinyl pyrrolidine film. Fifty parts of a fine powder of a polymer having quaternary ammonium salt groups obtained by treating polychloromethylstyrene with dimethyllaurylamine was mixed with 1 part of polyethylene glycol having a molecular weight of 20,000. The mixture was dispersed in the space defined by the molding frame, and heated to 90° C. As a result, the mixture was melted and a uniform ion-exchange layer formed. The resulting structure was left to stand in an atmosphere having a relative humdity of 70%, and a counter electode was laminated to the resulting structure to build an ECD. The properties of the ECD are shown in Table 2.

EXAMPLE 8

By the same method as in Example 7, an electrochromic membrane/KIEM composite membrane was prepared from an electrochromic membrane and an ion-exchange membrane (KIEM) layer containing sulfonic acid groups.

The electrochromic membrane/KIEM composite membrane was dried under reduced pressure, and a 2% aqueous solution of polyacrylamide (molecular weight about 300,000) was applied to the KIEM membrane surface of the composite membrane and dried in air and under reduced pressure. The thickness of the resulting polyacrylamide thin film so obtained was about 2 microns when calculated from the weight increase. The resulting membrane-like product was put in a plasma generating device, and the inside of the device was deaerated under reduced pressure. Pyridine gas diluted with helium gas was supplied at 13.75 MHz to perform plasma polymerization on the electrochromic membrane. The membrane-like composite was immersed in molten polypropylene glycol (molecular weight 5000) to impregnate it fully into the polymer obtained by plasma polymerization. The weight increase was about 50%. The product was sprayed with 1N sulfuric acid and then dried in an atmosphere having a relative humidity of 70% at room temperature. A counter electrode was laminated to the resulting product to form an ECD. The properties of the ECD are shown in Table 2.

EXAMPLE 9

A membrane layer containing about 60 microns of anion-exchange groups was formed on an electrochromic membrane by the same method as in Example 4. The membrane layer was then dried under reduced pressure, and an aqueous solution of polyvinyl alcohol having a molecular weight of about 50,000 was applied to the surface of the ion-exchange membrane layer by spin coating. The thickness of the polyvinyl alcohol layer, calculated from the weight increase, was less than 10 microns. The polyvinyl alcohol layer was dried under reduced pressure, and then a molding frame having a thickness of 100 microns was placed on it. A 50% aqueous solution of a polymer containing phosphoric acid groups obtained in Example 4 was cast into the frame, and dried in air and then under reduced pressure to form a membrane layer containing cation-exchange groups. A counter electrode was laminated to the cation-exchange membrane layer to build an ECD. The properties of the ECD are shown in Table 2.

EXAMPLE 10

A membrane of a polymer containing sulfonic acid groups was formed of an electrochromic membrane in the same way as in Example 5 to form a composite membrane. A 5% solution of nitrocellulose in a 2:1 mixture of ethyl ether and ethyl alcohol was coated on the sulfonic acid group-containing polymer layer of the composite membrane by spin coating. The nitrocellulose membrane had a thickness of 1 micron as calculated from the weight increase.

Six parts of NBR rubber (acrylonitrile/butadiene copolymer rubber) was uniformly dissolved in 50 parts of 4-vinylpyridine, 5 parts of styrene and 10 parts of divinylbenzene having a purity of 55% to form a viscous paste-like mixture. Furthermore, 0.1 part of benzoyl peroxide was dissolved in the mixture. A molding frame (50 microns) was placed on the nitrocellulose film surface of the composite membrane, and the above paste-like monomeric mixture was put in the molding frame. The entire assembly was put in an autoclave, and heated at 90° C. for 3 hours in a nitrogen atmosphere under 10 kg/cm² to perform polymerization. The composite membrane was then immersed for 8 hours in a 4:6 mixture of n-hexane and methyl iodide by weight to N-methylate the puridine ring, followed by washing with water. In an atmosphere having a relative humidity of 60%, a counter electrode was laminated to build an ECD. The properties of the resulting ECD are shown in Table 2.

TABLE 2

| Example | Electrochromic membrane | Response speed (milliseconds) | Contrast | Power Consumption (mW) | Life time (cycles) |
|---|---|---|---|---|---|
| 1 | I membrane | 12 | 3.5 | 1.6 | $2 \times 10^7$ |
|   | W membrane | 170 | 4.6 | 10 | $4 \times 10^6$ |
| 2 | I membrane | 11 | 3.4 | 17 | $3 \times 10^7$ |
|   | W membrane | 180 | 4.8 | 10 | $3 \times 10^6$ |

TABLE 2-continued

| Example | Electro-chromic membrane | Response speed (milliseconds) | Contrast | Power Consumption (mW) | Life time (cycles) |
|---|---|---|---|---|---|
| 3 | I membrane | 10 | 3.5 | 16 | $2 \times 10^7$ |
|   | W membrane | 170 | 4.7 | 11 | $5 \times 10^6$ |
| 4 | I membrane | 10 | 3.6 | 15 | $1 \times 10^7$ |
|   | W membrane | 180 | 4.4 | 12 | $4 \times 10^6$ |
| 5 | I membrane | 12 | 3.5 | 16 | $3 \times 10^7$ |
|   | W membrane | 180 | 4.8 | 10 | $3 \times 10^6$ |
| 6 | I membrane | 16 | 3.5 | 17 | $4 \times 10^7$ |
|   | W membrane | 190 | 4.5 | 12 | $6 \times 10^6$ |
| 7 | I membrane | 18 | 3.4 | 18 | $5 \times 10^7$ |
|   | W membrane | 190 | 4.3 | 11 | $7 \times 10^6$ |
| 8 | I membrane | 17 | 3.6 | 17 | $4 \times 10^7$ |
|   | W membrane | 200 | 4.7 | 13 | $7 \times 10^6$ |
| 9 | I membrane | 16 | 3.5 | 18 | $3 \times 10^7$ |
|   | W membrane | 190 | 4.8 | 12 | $8 \times 10^6$ |
| 10 | I membrane | 17 | 3.3 | 17 | $5 \times 10^7$ |
|   | W membrane | 200 | 4.5 | 12 | $7 \times 10^6$ |

EXAMPLE 11

A polyvinyl chloride sheet having a thickness of 30 microns was immersed in a mixture of chloromethylstyrene, divinylbenzene and benzoyl peroxide to impregnate these monomers sufficiently into the sheet. The sheet was then immersed in a boiling saturated solution of sodium sulfate to polymerize the monomers. The resulting membrane was immersed in a 25% solution of trimethylamine in acetone-water to aminate the chloromethyl groups in the membrane.

Separately, 5 parts of commercial sodium styrenesulfonate was dissolved in 150 parts of water, and 0.1 part of sodium sulfite and 0.2 part of sodium persulfate were added. The mixture was heated at 80° C. for 10 hours. The resulting slightly viscous solution was dried by a rotary evaporator to obtain a slightly yellow solid. The solid had an inherent viscosity, measured in water at 20.5° C., of 0.116 dl/g.

The resulting poly(sodium styrenesulfonate) was passed through a column of an acid-type cation-exchange resin to convert it to an acid-type. It was dried again in the same way, and dissolved in ethylene glycol to a concentration of 50% to form a viscous solution.

The solution of the polystyrenesulfonic acid was coated in thin film form on the same electrochromic membrane and the counter electrode as in Example 1. A thin anion-exchange membrane was interposed between the electrochromic membrane and the counter electrode, and the entire assembly was pressed to build an ECD. The electrochromic membrane was segmented at intervals of 0.5 mm both in the direction of X-axis and the direction of Y-axis, and voltage was applied to perform displaying. When a signal was sent to a segment existing in the 15th place in the Y-axis direction and in the 15th place in the X-axis direction, only that segment (15, 15) could be very clearly colored and disclosed.

When a 50% ethylene glycol solution of polystrenesulfonic acid was used between the electrochromic membrane and the counter electrode in the above ECD, and the same signal was sent, not only the segment (15, 15) but also its vicinity was colored. When only the thin anion-exchange membrane alone was used as the electrolyte layer and a signal was sent to the segment (15, 15), the same result was obtained.

When polystyrenesulfonic acid was coated only on the counter electrode or the electrochromic membrane, the thin anion-exchange membrane was laminated on it, and the electrochromic membrane or the counter electrode was directly laminated onto the anion-exchange membrane layer, the segment (15, 15) responded only at the time of coloration. Or at other times, coloration extended to the vicinity of the segment (15, 15), and only the segment (15, 15) was discolored while the discoloration of the colored vicinity was incomplete.

EXAMPLE 12

One part of polystyrenesulfonic acid having a molecular weight of about 500,000 and polyvinyl alcohol having a degree of polymerization of 1500 were dissolved in hot water to form a viscous aqueous solution. The aqueous solution was cast on a flat glass plate, and water was scattered to form a film having a thickness of 50 microns. The film was immersed in a formalization bath composed of formaldehyde, water, sulfuric acid and sodium sulfate to perform a crosslinking reaction to form a water-insoluble film.

Separately, 20 parts of chloromethylstyrene was added to 70 parts of methyl ethyl ketone, and 6 parts of lauryl dimethylamine was added. In a flask equipped with a cooling tube, the mixture was reacted at 70° C. for 15 hours. Methyl ethyl ketone was evaporated by a rotary evaporator to obtain the reaction product of chloromethylstyrene and lauryl dimethylamine.

Thirty parts by weight of a polymer containing quaternary ammonium salt groups obtained as above and 2 parts of diethylene glycol were dissolved in 40 parts of water to form a slightly viscous solution. The solution was coated on the same electrochromic membrane and counter electrode as in Example 1. The insoluble film obtained above was interposed between the electrochromic membrane and the counter electrode, and the assembly was pressed to build an ECD.

The electrochromic membrane was segmented in the same way as in Example 11 at intervals of 0.5 mm in the directions of the Y-axis and the X-axis. When a signal was sent only to a segment (15, 15) as in Example 11, that segment alone was colored clearly. On the other hand, when the insoluble film or the anion-exchange polymer alone was used as the electrolyte layer, the vicinity of the segment (15, 15) was also markedly colored in the same test.

EXAMPLE 13

A film of a perfluoro(3,6-dioxa-4-methyl-7-octenesulfonyl fluoride)/tetrafluoroethylene copolymer having an exchange capacity of 0.91 milliequivalent/g of dry film (H-type) was immersed at 90° C. for 2 hours in a hydrolysis bath composed of 30 parts of dimethyl sulfoxide, 55 parts of water and 15 parts of sodium hydroxide to introduce sodium sulfonate groups. The film was then immersed in 1N hydrochloric acid to convert the sodium sulfonate groups into sulfonic acid groups. At this time, hydrochloric acid was exchanged three times. The sulfonic acid-type membrane was put into an autoclave together with a 4:1 mixture of isopropyl alcohol and water, and heated at 250° C. for 5 hours. Most of the film dissolved.

The solution so obtained was coated on an electrochromic membrane segmented in the X-axis and Y-axis directions in the same way as in Example 11, and dried in air.

Separately, a 20-micron sheet of polyethylene was impregnated with styrene, divinylbenzene and benzoyl peroxide at an elevated temperature. Both surfaces of the sheet were covered with cellophane and the monomers were polymerized at 100° C. to form a membrane-like product. The product was then cooled to 4° C. and immersed in a chlorosulfonating bath composed of 2 parts of ethylene dichloride and 1 part of chlorosulfonic acid, and then immersed for 10 minutes in a 50% aqueous solution of tetraethylenepentamine to bond tetraethylenepentamine to the surface of the membrane by a sulfonamide linkage. The membrane was further immersed in 0.5N sodium hydroxide to convert the sulfonyl chloride groups in the inside of the membrane to sodium sulfonate groups. The resulting thin membrane was repeatedly immersed in 0.5N HCl to form a membrane having a positive charge on the surfaces of both surface layers of the membrane and containing sulfonic acid groups in the inside of the membrane.

The membrane was laminated to the thin film of the polymer containing sulfonic acid groups formed on the electrochromic membrane. A 50% aqueous solution of polyethyleneimine hydrochloride having a molecular weight of about 5000 was coated on the opposite surface of the composite membrane, and a counter electrode was laminated to the polyethyleneimine hydrochloride layer. As a result, an ECD was constructed which contained two cation-exchange membrane layers and two anion-exchange membrane layers arranged alternately.

When a signal was sent to a segment (15, 15) of this ECD, that segment was very clearly colored, and no coloration occurred in segments in its vicinity. Discoloration of the segment (15, 15) was complete.

When instead of the multi-layer electrolyte layer as above, the electrolyte layer was constructed only of perfluorocarbonsulfonic acid, and a signal was sent to the segment (15, 15), not only that segment but also segments in its vicinity were colored.

EXAMPLE 14

Fifty parts of a fine powder of antimonic acid and 50 parts of a fine powder of polyvinyl chloride were mixed uniformly. The mixture was interposed between hot plates and formed into a film having a thickness of 0.09 mm. Both surfaces of the film were polished by sand paper (1500 mesh) to shave it by about 5 microns in thickness on both surfaces. The film was then dispersed between 0.5N aqueous sodium chloride solution and 2.5N aqueous sodium chloride solution, and the membrane potential of the film was measured. From the measured potential, the transport number was determined. The transport number of the cation was 0.85.

Poly-4-vinylpyridine hydrochloride was applied to both surfaces of this inorganic cation-exchange membrane. Specifically, 4-vinylpyridine was dispersed in pure water, and 2.5%, based on 4-vinylpyridine, of benzoyl peroxide was added. The mixture was heated at 80° C. with stirring. The resulting pale yellow rubbery polymer was taken out, and dried under reduced pressure. Thereafter, hydrochloric acid was added in an equivalent weight to the pyridine ring to convert the polymer to its hydrochloride. A 50% aqueous solution of the resulting poly-4-vinylpyridine hydrochloride was applied to both surfaces of the inorganic cation-exchange membrane. An electrochromic membrane and a counter electrode were laminated to the opposite surfaces of the coated cation exchange membrane to build an ECD.

The electrochromic membrane of the ECD was segmented in the same way as in Example 11 in the directions of the X-axis and Y-axis and a signal was sent to a segment (15, 15), coloration and discoloration took place only at that segment (15, 15), and no coloration nor discoloration occurred in its vicinity.

On the other hand, when only the poly-4-vinylpyridine hydrochloride was used as the electrolyte layer, not only the segment (15, 15) but also its vicinity was colored in the same test.

When only the inorganic ion exchange-membrane layer was used as the electrolyte layer, other segments than the segment (15, 15) were colored. Furthermore, the adhesion of the electrolyte layer to the electrochromic layer and the counter electrode was poor.

EXAMPLE 15

A 20 micron-thick film of polyethylene was impregnated with styrene, divinylbenzene and benzoyl peroxide, and then immersed in a boiling 4.0N sodium sulfate solution to polymerize the monomers under heat. The film was then immersed for 10 minutes in 98% conc. sulfuric acid at 50° C. to sulfonate both surfaces of the film and introduce sulfonic acid groups only into the surface layer portions of the film.

The membrane was then immersed in a cloromethylating bath composed of chloromethyl ether, tin tetrachloride and carbon tetrachloride to introduce chloromethyl groups into the interior of the membrane. The membrane was then immersed into a 2.5N acetone/water solution of dimethylamine to introduce tertiary amino groups into the interior of the membrane. The membrane was then equilibrated in 1N hydrochloric acid and 0.5N aqueous sodium chloride solution, and then in 1.0N hydrochloric acid, and thereafter immersed in a dye bath containing Crystal Violet. The dyeing of the membrane was examined. It was found that the membrane was dyed to a depth of about 2 microns on both surfaces when viewed with respect to its cut sectional surface.

Separately, 10 parts of the same polystyrene sulfonic acid having a molecular weight of about 500,000 as used in Example 12 was mixed with 90 parts of a fine powder of antimonic acid. The mixture was coated on both surface layer portions of the membrane having sulfonic acid groups as prepared above. The membrane synthesized in Example 13 having amino groups on the surface layer portion was laminated to one surface of the coated membrane. An electrochromic membrane was laminated to that surface of the composite membrane on which a layer composed of polystyrenesulfonic acid-/antimonic acid existed, and a mixture of polystyrenesulfonic acid and antimonic acid was coated further on the membrane having the ethylenediamine layer. A counter electrode was laminated onto the resulting coating to build an ECD.

The electrochromic layer of the ECD containing the multilayered electrolyte layer was segmented in the directions of the X-axis and Y-axis in the same way as in Example 11 and a signal was sent to a segment (15, 15), only that segment (15, 15) was repeatedly colored and discolored.

On the other hand, when the electrolyte layer was constructed only of polystyrenesulfonic acid and antimonic acid, not only the segment (15, 15) but also its vicinity was colored and discolored.

EXAMPLE 16

In the same way as in Example 2, a 0.05 mm-thick thin membrane of a polymer of perfluorocarbonsulfonic acid was formed on an electrochromic membrane composed of $WO_3$ or $IrO_2$. A fine powder of platinum black was dispersed over the resulting membrane. A dispersion of the above perfluorocarbon sulfonic acid polymer in ethanol was coated further on it, and dried. Thereafter, a dispersion of a mixture of a polymer having quaternary ammonium salt groups obtained by treating polychloromethylstyrene with dimethyl laurylamine and polyethylene glycol having a molecular weight of 20,000 was coated further as in Example 2. The entire assembly was heated to 90° C. to form an anion-exchange membrane layer.

Separately, a solution of the above perfluorocarbon-sulfonic acid polymer in a mixture of isopropanol and water as in Example 2 was repeatedly coated on the same counter electrode as used in Example 1 to form a thin membrane having a thickness of 0.05 mm. A fine powder of platinum black was coated on the surface of this membrane.

The anion-exchange membrane layer prepared above was laminated to the platinum black-coated thin membrane surface, and the assembly was left to stand in an atmosphere kept at a relative humidity of 70% to build an ECD.

The resulting ECD had a response speed of 8 msec., a power consumption of 15 mW and a life of $4\times10^7$ cycles when the electrochromic membrane was an I membrane, and a response speed of 150 msec, a power consumption of 8 mW and a life of $4\times10^6$ cycles when the electrochromic membrane was a W membrane.

The degree of coloration of the ECD was examined by applying varying voltages. Clear coloration began at an applied voltage of 0.9 V.

What is claimed is:

1. An electrochromic display comprising a transparent electroconductive substrate as an electrode, an electrochromic layer, an ion-exchange membrane and a counter electrode in a laminated structure, said ion-exchange membrane being a bipolar ion-exchange membrane comprising at least one cation-exchange membrane layer having cation-exchange groups and at least one anion-exchange membrane layer having anion-exchange groups in a laminated structure.

2. The electrochromic display of claim 1 wherein at least one layer of the bipolar ion-exchange membrane is a solid polymeric membrane containing ionic groups.

3. The electrochromic display of claim 1 wherein the bipolar ion-exchange membrane is a laminated structure of at least one liquid ionic polymer layer and at least one solid ionic polymeric membrane.

4. The electrochromic display of claim 1 wherein the bipolar ion-exchange membrane is a three-layer laminated structure composed of two layers containing cation-exchange groups and one layer containing anion-exchange groups sandwiched between the cation-exchange membrane layers.

5. The electrochromic display of claim 4 wherein the layer containing anion-exchange groups is a layer of a liquid ionic polymer, and the layers containing cation-exchange groups are solid ionic polymeric membranes.

6. The electrochromic display of claim 4 wherein the layers containing cation-exchange groups are liquid ionic polymer layers, and the layer containing anion-exchange groups is a solid ionic polymeric membrane.

7. The electrochromic display of claim 1 wherein the bipolar ion-exchange membrane has such a property that when a curve representing a voltage applied to it versus a current flowing therethrough is measured, it shows a nonlinear voltage-current curve in which a small amount of current flows when the applied voltage is up to a certain value, and a large amount of current flows abruptly when the value exceeds said certain voltage.

8. The electrochromic display of claim 1 wherein the electrochromic membrane is divided into n and m segments in the directions of the X-axis and Y-axis, wherein n and m are positive integers.

* * * * *